US007381332B2

(12) United States Patent
Pena et al.

(10) Patent No.: US 7,381,332 B2
(45) **Date of Patent: *Jun. 3, 2008**

(54) SOLID-LIQUID SEPARATION OF OIL-BASED MUDS

(75) Inventors: Jorge Eduardo Adams Pena, Bogota (CO); Henry M. Masias, Hamden, CT (US); Sun-Yi Huang, Stamford, CT (US); Raymond S. Farinato, Norwalk, CT (US)

(73) Assignee: Kemira Oyj (FI)

( * ) Notice: Subject to any disclaimer, the term of this patent is extended or adjusted under 35 U.S.C. 154(b) by 5 days.

This patent is subject to a terminal disclaimer.

(21) Appl. No.: 10/892,847

(22) Filed: Jul. 16, 2004

(65) Prior Publication Data

US 2005/0067194 A1 Mar. 31, 2005

Related U.S. Application Data

(63) Continuation-in-part of application No. 10/674,441, filed on Sep. 30, 2003, now Pat. No. 7,338,608.

(51) Int. Cl.
*B01D 11/00* (2006.01)
*C02F 1/44* (2006.01)

(52) U.S. Cl. ........................ 210/639; 175/66; 210/732; 210/733

(58) Field of Classification Search ................ 210/634, 210/639, 732–736, 747, 767, 787, 788, 800, 210/749; 175/66, 206; 507/117–122, 216–225; 516/21, 31

See application file for complete search history.

(56) References Cited

U.S. PATENT DOCUMENTS 2,476,846 A 7/1949 Dawson ...................... 252/8.5
4,040,866 A 8/1977 Mondshine .................. 134/26
4,439,332 A 3/1984 Frank et al. ........... 252/8.55 D
4,482,459 A 11/1984 Shiver ........................ 210/639
4,521,317 A 6/1985 Candau et al.
4,670,501 A * 6/1987 Dymond et al. ............ 524/458
4,681,912 A 7/1987 Durand et al. .............. 524/827
4,777,200 A * 10/1988 Dymond et al. ............ 524/458
4,913,585 A 4/1990 Thompson et al. ......... 405/128
5,037,863 A 8/1991 Kozakiewicz et al. ...... 523/223
5,037,881 A 8/1991 Kozakiewicz et al. ...... 524/812
5,090,498 A 2/1992 Hamill ....................... 175/206
5,156,686 A 10/1992 Van Slyke ................... 134/26
5,405,554 A 4/1995 Neff et al. .................. 252/309
5,530,069 A 6/1996 Neff et al. ............... 525/329.4
5,548,020 A 8/1996 Santini et al. ............. 524/801
5,763,523 A 6/1998 Chen et al. ................. 524/521
5,945,494 A 8/1999 Neff et al. ............... 526/292.2
6,060,434 A * 5/2000 Sweatman et al. .......... 507/216
6,550,552 B1 * 4/2003 Pappa et al. .................. 175/66
6,668,947 B2 12/2003 Cordova ...................... 175/66
2003/0083532 A1 5/2003 Malhis ....................... 585/241
2005/0067194 A1 * 3/2005 Pena et al. .................... 175/66
2005/0067350 A1 3/2005 Pena et al. .................. 210/634

FOREIGN PATENT DOCUMENTS

EP 0164225 11/1985
EP 0164225 A2 11/1985
EP 0 374 457 A2 6/1998

OTHER PUBLICATIONS

Sharma, S. K. and A. G. Smelley (1991) "Use of flocculants in dewatering of drilling muds." Advances in Filtration and Separation Technology 3 (Pollution Control Technol. Oil Gas Drill. Prod. Oper.) pp. 43-51.
Eldridge, R. B. (1996) "Oil Contaminant Removal from Drill Cuttings by Supercritical Extraction." Industrial & Engineering Chemistry Research 35(6): 1901-1905.
Julio Oswaldo Bello Torres and Luis Hernando Pérez Cárdenas entitled "Analisis Tecnico Economico de un Metodo Fisico Quimico Alternativo Para la Separacion de Agua y Solidos en Lodos Base Aceite", Fundacion Universidad de America, Santafé De Bogotá, D. C. (1999), Chapter 3 (Emulsions).
Field, S. D., A. Wojtanowicz, et al. (1987) "Deliquification of oilfield drilling slurries and production sludges." Proceedings of the Industrial Waste Conference, 41st: pp. 481- 487.
Chemical Engineer's Handbook, Fifth Edition, McGraw-Hill Book Company, 1973, pp. 19-3 to 19-14 and 21-3 to 21-10.
Chemical Engineer's Handbook, Fifth Edition, McGraw-Hill Book Company, 1973, pp. 19-44 to 19-104 and 21-11 to 21-14.

* cited by examiner

*Primary Examiner*—Joseph Drodge
(74) *Attorney, Agent, or Firm*—Cantor Colburn LLP

(57) ABSTRACT

This invention relates to a method of achieving a solid-liquid separation of an oil-based mud comprising the step of contacting said oil-based mud with a water-in-oil emulsion comprising a polymer derived from at least one water-soluble monomer, where the polymer is not dissolved prior to contact with the oil-based mud, mixing the water-in-oil emulsion and the oil-based mud and separating the solid phase from the liquid phase in the oil-based mud. In addition, this invention also relates to a composition comprising an oil-based mud with a water-in-oil emulsion comprising a polymer derived from at least one water-soluble monomer, wherein the polymer is not dissolved prior to contact with the oil-based mud.

17 Claims, No Drawings

SOLID-LIQUID SEPARATION OF OIL-BASED MUDS

This application is a continuation-in-part of U.S. application Ser. No. 10/674,441, filed Sep. 30, 2003 now U.S. Pat. No. 7,338,608.

FIELD OF THE INVENTION

The invention is directed to a method of solid-liquid separation of oil-based muds. In particular, the invention relates to a method of separating solid and liquid phases of oil-based muds by contacting the muds with a water-in-oil emulsion comprising a polymer derived from at least one water-soluble monomer.

BACKGROUND OF THE INVENTION

Oil-based muds form a general class of materials that minimally comprise a mixture of particulate solids in an oil-continuous phase. A subset of oil-based muds is oil-based drilling muds, which contain functional fluids used to improve drilling operations in several ways. These fluids are circulated through and around the drill bit to lubricate and cool the bit, provide flotation to help support the weight of the drill pipe and casing, coat the wellbore surface to prevent caving in and undesirable fluid flow, and to carry drill cuttings away from the bit to the surface. Such oil-based drilling fluids are oil-continuous compositions that may also contain an aqueous solution (e.g. calcium chloride brine) as a discontinuous phase (making the fluids water-in-oil inverse emulsions), emulsifiers to stabilize the inverse emulsion, rheology modifying agents (e.g. oleophilic clays), weighting agents (e.g. barium sulfate), fluid loss control agents (e.g. lignins), and other additives (e.g. lime). Used oil-based drilling muds will contain, in addition to the above components, drill cuttings and other dissolved or dispersed materials derived from the drilled medium or from other sources of contamination such as process and environmental waters. Waste oil-based muds are simply used or contaminated oil-based drilling muds containing a sufficient concentration of drill cuttings or other components to warrant either a disposal or a recycling of the mud.

Waste management of oil-based drilling muds, made with either diesel or synthetic oil, is a high priority for companies drilling both onshore and offshore wells. The current trend in managing these waste oil-based drilling muds (i.e. drilling fluids laden with cuttings) is moving towards reclamation and recycling of the muds. Much of this trend is a response to regulation. Reclamation and recycle of these fluids almost always requires a good separation of the oil phase and possibly the aqueous phase from the oil-based drilling muds.

The methods used for solid-liquid separation of oil-based drilling muds (OBDMs), have included mechanical, thermal and some chemical treatments. The chemical treatments include the use of: sodium silicates in U.S. Pat. No. 2,476,846; organic solvents in U.S. patent application Ser. No. 4,040,866; a neutralization-flocculation scheme in which a dissolved polymeric flocculant was employed in U.S. Pat. No. 4,482,459; polyethylene oxides to dewater OBDMs (Sharma, S. K. and A. G. Smelley (1991) "Use of flocculants in dewatering of drilling muds." Advances in Filtration and Separation Technology 3 (Pollution Control Technol. Oil Gas Drill. Prod. Oper.) pp 43-51); water and surfactants or oil washes in U.S. Pat. No.5,090,498; carboxylic acids in combination with pH cycling in U.S. Pat. No. 5,156,686; supercritical fluid extraction (Eldridge, R. B. (1996) "Oil Contaminant Removal from Drill Cuttings by Supercritical Extraction." Industrial & Engineering Chemistry Research 35(6): 1901-1905); surfactants with pH adjusters in U.S. Patent Application Publication No. 2003056987 A1, and acid treatment followed by a dissolved water-soluble polymer in U.S. Patent Application Publication No. 2003083532 A1.

In a thesis by Julio Oswaldo Bello Torres and Luis Hernando Pérez Cárdenas entitled "Analisis TecnicoEconomico de un Metodo FisicoQuimico Alternativo Para la Separacion de Agua y Solidos en Lodos Base Aceite", Fundacion Universidad de America, Santafé De Bogotá, D. C. (1999), both solid and water-in-oil emulsion polymer flocculants were diluted in water at about 3% by weight concentration and then mixed with OBDMs. None of the polymer flocculants were directly or neatly mixed with OBDMs prior to dilution with water.

While the above treatments may be used to some extent in the separation of particulate solids from OBDMs, they each have their own drawbacks, whether it be in terms of process inefficiency, the generation of additional volumes of waste to be treated, or lack of economic viability.

The inventors of the present invention have discovered that the direct use of neat or oil-diluted water-in-oil emulsions in which the discrete phase contains a polymer comprising at least one water-soluble monomer provides excellent separation of oil from oil-based drilling muds. This is rather surprising since there are some documents that have statements that indicate a lack of utility of water-soluble polymers in treating OBDMs (e.g., Field, S. D., A. Wojtanowicz, et al. (1987) "Deliquification of oilfield drilling slurries and production sludges." Proceedings of the Industrial Waste Conference, 41st: pp 481-7).

SUMMARY OF THE INVENTION

This invention relates to a method of achieving a solid-liquid separation of an oil-based mud comprising the step of contacting said oil-based mud with a water-in-oil emulsion comprising a polymer derived from at least one water-soluble monomer, where the polymer is not dissolved prior to contact with the oil-based mud, mixing the water-in-oil emulsion and the oil-based mud and separating the solid phase from the liquid phase in the oil-based mud.

In addition, this invention also relates to a composition comprising an oil-based mud with a water-in-oil emulsion comprising a polymer derived from at least one water-soluble monomer, wherein the polymer is not dissolved prior to contact with the oil-based mud.

DETAILED DESCRIPTION OF THE INVENTION

In the present invention, "Drill cuttings" means earth-based solids including, but not limited to gravel, sand, dirt, soil, mud, minerals, fragmented rock, clay, silt and ash.

"Oil" means a hydrocarbon based material such as natural or synthetic oils, fats, greases, or waxes, including but not limited to those derived from animal, vegetable, or mineral sources; synthetic oils and greases containing hydrocarbon groups, such as organopolysiloxanes (silicones); and mixtures thereof. The oil typically comprises a substantially hydrocarbonaceous oil or grease, usually a natural or synthetic petroleum or petroleum product, such as crude oil, heating oil, bunker oil, kerosene, diesel, gasoline, paraffin blends, internal olefins, $C_{16}$ to $C_{18}$ alkene blends, naphtha, shale oil, coal oil, tar, lubricating oil, motor oil, solvents, waxes, and lubricating greases. Additionally, the oil may contain small amounts of a finely divided discontinuous phase in the form of aqueous droplets, solid particles, or a mixture of both.

"Mud" means a flowable mixture of finely divided solids in a liquid.

"Oil-Based Mud" (OBM) means a mud containing at least some oil (e.g., at least 1% or at least 2% or at least 5% oil by volume based on the total volume of the mud.

"Oil-based drilling mud" (OBDM) means oil-based mud that is used in the drilling industry comprising drilling muds and drill cuttings. Typical oil-based drilling muds comprise an oil-continuous phase and may also contain an aqueous solution (e.g. sodium, potassium or calcium chloride brine) as a discontinuous phase along with other additives such as emulsifiers, rheology modifying agents (e.g. oleophilic clays), weighting agents (e.g. barium sulfate), fluid loss control agents (e.g. lignins), etc. Further description of such drilling muds may be found in U.S. Patent Application Publication Nos. 2003/0056987 A1 and 2003/0083532 A1, as well as U.S. Pat. No. 5,156,686, herein incorporated by reference.

"Water-in-oil emulsion" means a dispersion of an aqueous phase as discrete droplets or particles within a continuous oil phase. The composition of the discrete aqueous phase may consist of a water-containing material that may range from substantially water, to a concentrated aqueous solution of a low-molecular weight water-soluble substance, to a concentrated aqueous solution of a water-soluble or water-swellable polymer, or any combination thereof. The continuous oil phase may also contain oil-soluble substances.

"Well dispersed" means contacting or mixing components until a homogeneous or substantially homogeneous composition ensues.

This invention relates to a method of separating a solid phase from a liquid phase in an oil-based mud comprising the steps of contacting the oil-based mud with a water-in-oil emulsion comprising a polymer derived from at least one water-soluble monomer, where the polymer is not dissolved prior to contact with the oil-based mud; mixing the water-in-oil emulsion and the oil-based mud and separating the solid phase from the liquid phase. The liquid phase may be an oil phase and/or an aqueous phase. Preferably, the liquid phase is an oil phase. In the case where the liquid phase contains both oil and water, this invention also relates to a method of separating the oil and aqueous phases both from each other and from the solid phase. Therefore, separating the solid phase from the liquid phase also may mean separating the oil and aqueous phases both from each other and from the solid phase.

This invention also contemplates separating a solid phase from a liquid phase in an oil-based drilling mud.

The inventors have discovered that degree of separation of a solid phase from a liquid phase in the oil-based mud (OBM) is greatly improved if the polymer in the water-in-oil emulsion is not substantially solubilized or dissolved prior to contact with the OBM.

The polymer in the water-in-oil emulsion, which may be cationic, anionic, ampholytic, or nonionic, is derived from at least one water-soluble monomer. The water-soluble monomer is typically a water-soluble vinyl monomer. Non-limiting examples of water-soluble monomers that may be used include cationic, anionic or non-ionic monomers such as (alkyl)acrylamide, (alkyl)acrylic acid, N-vinylpyrrolidone, N-vinylacetamide, N-vinylformamide, acrylonitrile, furmaric acid, crotonic acid, maleic acid, hydroxyalkyl methacrylates, 2-acrylamido-2-alkylsulfonic acids wherein the alkyl group contains 1 to 6 carbon atoms, styrene sulfonic acids, vinyl sulfonic acids; and salts of any of the foregoing thereof; or monomers having the structure of formulas I, II or III

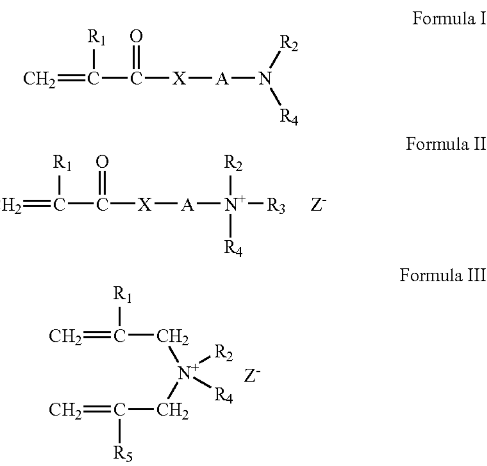

wherein $R_1$, $R_2$, and $R_5$ are each independently hydrogen or a $C_1$ to $C_6$ alkyl; $R_3$ and $R_4$ are each independently hydrogen, a $C_1$ to $C_{12}$ alkyl, aryl, arylalkyl, or hydroxyethyl; and $R_2$ and $R_4$ or $R_2$ and $R_3$ can combine to form a cyclic ring containing one or more hetero atoms; Z is the conjugated base of an acid, X is oxygen or —$NR_6$ wherein $R_6$ is hydrogen or a $C_1$ to $C_6$ alkyl; and A is a $C_1$ to $C_{12}$ alkylene.

In one embodiment, the water-soluble vinyl monomers are (alkyl)acrylamide, (alkyl)acrylic acid and its salts and vinyl sulfonic acid.

The term (alkyl)acrylamide means an acrylamide monomer or alkylacrylamide monomers such as methacrylamide, ethylacrylamide, butylacrylamide and the like. Likewise, (alkyl)acrylic acid means acrylic acid, methacrylic acid, ethylacrylic acid and the like. The term "(meth)acrylamide" means acrylamide or methacrylamide.

As mentioned above, the polymer in the water-in-oil emulsion may be derived from more than one monomer (e.g., a copolymer, terpolymer, etc.). In the present invention, the term "copolymer" means a polymer derived from two or more monomers. A "homopolymer" means a polymer derived from just one monomer. The term "polymer" means either a homopolymer or copolymer. An ampholytic polymer contains both anionic and cationic monomers in the same chain, not necessarily in equal molar amounts.

In one embodiment, the polymer in the water-in-oil emulsion is a copolymer of an (alkyl)acrylamide monomer and at least one second monomer selected from N-vinylpyrrolidone, N-vinylacetamide, N-vinylformamide, acrylonitrile, acrylic acid, methacrylic acid, ethylacrylic acid, furmaric acid, crotonic acid, maleic acid, hydroxyalkyl methacrylates, 2-acrylamido-2-alkylsulfonic acids wherein the alkyl group contains 1 to 6 carbon atoms, styrene sulfonic acids; and salts of any of the foregoing thereof; or monomers of Formulas I, II or III. Preferably the (alkyl)acrylamide is a (meth)acrylamide and more preferably acrylamide.

In another embodiment, the polymer in the water-in-oil emulsion is a cationic copolymer of (meth)acrylamide and at least one second monomer selected from the group consisting of N,N-dimethylaminoethyl(meth)acrylate or its salts, quaternary N,N-dimethylaminoethyl(meth)acrylates, including the methylchloride or methosulfate salts, tertiary or quaternary N,N-dimethylaminopropyl acrylamides, tertiary or quaternary N,N-dimethylaminomethyl acrylamides and diallyl dimethyl ammonium halides.

In another embodiment, the polymer in the water-in-oil emulsion is an anionic copolymer of (meth)acrylamide and at least one second monomer selected from acrylic acid, methacrylic acid, ethylacrylic acid, furmaric acid, crotonic acid, maleic acid, hydroxyalkyl methacrylates, 2-acrylamido-2-alkylsulfonic acids where the alkyl group contains 1 to 6 carbon atoms, styrene sulfonic acids; or salts of any of the foregoing thereof.

In another embodiment, the polymer in the water-in-oil emulsion is an anionic copolymer of (meth)acrylamide and (meth)acrylic acid.

In another embodiment, the polymer in the water-in-oil emulsion is a homopolymer or copolymer of monomers selected from (meth)acrylamide, monomers of Formula I and II and combinations thereof, where $R_1$ is hydrogen or methyl, $R_2$ to $R_4$ are methyl or ethyl, A is $C_1$ to $C_4$ alkylene and X is defined above.

In another embodiment, the polymer in the water-in-oil emulsion is an ampholytic polymer.

In another embodiment, the water-in-oil emulsion is a mixture of water-in-oil emulsions containing different polymers of the types described herein.

The water-in-oil emulsion used to separate the oil from the OBM comprise a continuous oil phase, which generally includes a water-immiscible inert organic liquid and a surfactant or surfactant mixture, and a discontinuous phase, preferably aqueous, which is in the form of droplets or particles containing the polymer derived from a water soluble monomer described above. The ratio of the aqueous phase to the oil phase should be about 0.1:1 to about 10:1, or about 0.20:1 to about 8:1, or about 0.5:1 to about 3:1. Preferably, the water-in-oil emulsion comprises from about 1 to about 80% weight percent aqueous phase, based on the total weight of the water-in-oil emulsion. The amount of polymer contained within the discontinuous phase of the water-in-oil emulsions can generally range from about a few percent, (e.g., about 2% or about 5% or about 10%) up to about 70% or about 80% or about 90% or even about 100% by weight, based on the total weight of discontinuous aqueous phase. The discontinuous aqueous phase may, therefore, contain 100% polymer and 0% water and are prepared using known methods in the art.

The total concentration of the polymer in the water-in-oil emulsion is about 1%, or about 5%, or about 10%, or about 20%, or about 40% by weight on the lower range to about 50%,or about 60% or about 70% by weight on the higher range, based on the total weight of the emulsion.

The polymers employed in the water-in-oil emulsions of the present invention are formed by conventional emulsion or suspension polymerization of the water-soluble monomers or mixtures of monomers disclosed above. Examples of such polymerizations are those disclosed in U.S. Pat. Nos. 5,037,881; 5,037,863; 4,681,912; 4,521,317; 4,439,332; 5,548,020; 5,945,494; 5,763,523 and European Patent Application EP 0 374 457 A2, each of which are incorporated herein by reference.

Emulsion polymerization procedures involve the preparation of two phases. The aqueous phase comprises the water-soluble monomer(s), and optionally branching agent and chain-transfer agent dissolved in water, and other additives well known to those skilled in this art, such as stabilizers and pH adjusters. The oil phase comprises a water-insoluble oil phase such as hydrocarbon solution of surfactant(s). The aqueous phase and oil phase are mixed and homogenized in a conventional apparatus until the average discrete phase particle size is less than about 10 microns and a suitable bulk viscosity is obtained. The emulsion is then transferred to a suitable flask wherein the emulsion is agitated and sparged with nitrogen for about thirty minutes. A polymerization initiator, such as sodium metabisulfite solution, is then continuously added to the solution to begin polymerization. Polymerization is allowed to exotherm to the desired temperature which is maintained by cooling until cooling is no longer required. Finished emulsion product is cooled to 25° C.

Typical surfactants useful in the oil phase of the emulsion include anionic, cationic and nonionic surfactants. Preferred surfactants include polyoxyethylene sorbitol fatty acids, sorbitan sesquioleate, polyoxyethylene sorbitan trioleate, sorbitan monooleate, polyoxyethylene (20) sorbitan monooleate, sodium dioctylsulfosuccinate, oleamidopropyldimethyl amine, sodium isostearyl-2-lactate, polyoxyethylene sorbitol monooleate or mixtures thereof and the like. Emulsifiers and surfactants useful in the invention are well documented in the relevant literature, for example, the Atlas HLB Surfactant Selector which is commonly referred to by those in this field.

Most known free-radical initiators may be employed to initiate polymerization. Suitable for use are azobisisobutyronitrile; oxygen with sodium sulfite, and/or sodium metabisulfite; 2,2,-azobis(2-methyl-2-amidinopropane)dihydrochloride; ammonium persulfate and ferrous ammonium sulfate hexahydrate, or other redox pairs. Organic peroxides may also be employed for polymerizing ethylenically unsaturated monomers. Particularly useful for the purpose of this invention is t-butyl hydroperoxide, see Modern Plastics Encyclopedia/88, McGraw Hill, October 1987, pp. 165-8. The amount of the initiator that is typically used in emulsion polymerization is about 1 to 1000 ppm, or about 25 to 750 ppm, or about 50 to 500 ppm, based on the amount of monomer present.

The temperature used for emulsion polymerization is typically about 10° C. to about 90° C., or about 20° C. to about 75° C., or about 25° to 60° C.

If a branched polymer is desirable, the polymerization of the monomers is conducted in the presence of a polyfunctional branching agent to form the branched homopolymer or copolymer. The polyfunctional branching agent comprises compounds having either at least two double bonds, a double bond and a reactive group or two reactive groups. Polyfunctional branching agents should have at least some water-solubility. Illustrative of those compounds containing at least two double bonds are methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide; and the like. Polyfunctional branching agents containing at least one double bond and at least one reactive group include glycidyl acrylate; acrolein; methylolacrylamide; and the like. Polyfunctional branching agents containing at least two reactive groups include aldehydes, such as glyoxal; diepoxy compounds and epichlorohydrin and the like.

Branching agents should be used in sufficient quantities to assure a highly branched copolymer product. Preferably, a branching agent content of from about 4 to about 80 molar parts per million, based on initial monomer content, is added to induce sufficient branching of the polymer chain.

A chain transfer agent may also be used in the emulsion polymerization. A molecular weight modifying or chain-transfer agent is used to control the structure and solubility of the polymer. Highly branched, polymer products are obtained when a chain-transfer agent is used, in optimum concentration, in conjunction with the branching agent. Many such chain-transfer agents are well known to those skilled in the art. These include alcohols, such as isopropyl alcohol; mercaptans; thioacids; phosphites and sulfites and sodium hypophosphite, although many different chain-transfer agents may be employed.

In the absence of a chain-transfer agent, the incorporation of even extremely small amounts of branching agent, e.g. 5 parts per million may cause crosslinking. A crosslinked polymer may also be used in this invention. That is, the polymer within the discrete droplets may actually be water-swellable and not water-soluble, or it may comprise a mixture of water-swellable and water-soluble species, and still act in an efficacious manner in the solid-liquid separation process described herein for oil-based muds. The term "branched polymers" includes compositions that consist of mixtures of polymers with different degrees of branching, including linear, within the same sample. The term "crosslinked polymers" include compositions that consist of mixtures of polymers with different degrees of crosslinking and branching, including linear, within the same sample.

A subset of emulsion polymerization is inversion microemulsion polymerization, which typically has more surfactants in the oil phase than emulsion polymerization. It is produced by (i) preparing a monomer containing microemulsion by mixing an aqueous solution of monomers with a hydrocarbon liquid containing an appropriate amount of surfactant or surfactant mixture to form an inverse microemulsion comprising small aqueous droplets dispersed in a continuous oil phase and (ii) subjecting the monomer-containing microemulsion to polymerization conditions. If desirable to form small aqueous droplets, mixing energy, e.g., shear, may be applied to the emulsion to obtain smaller aqueous droplets.

The formation of the inverse microemulsion depends on the proper selection of surfactant concentration and the hydrophilic-lypophylic balance (HLB) of the surfactant or surfactant mixture. Temperature, nature of the oil phase and composition of the aqueous phase will also affect microemulsion formation.

The one or more surfactants selected should provide an HLB value ranging from about 6 to about 12. The required HLB may vary from this, depending on the nature of the monomers, the nature and proportion of comonomer (if any) and the nature of the oil phase. In addition to the appropriate HLB range, the surfactant concentration must be sufficient to form an inverse microemulsion. Too low surfactant concentrations will not result in the formation of a microemulsion, while excessively high concentrations will increase costs without imparting significant benefit. For example, the minimum amount of surfactant for forming an inverse microemulsion containing anionic polymer will vary depending on the HLB of the surfactant system used; such minimum surfactant amount, based on total weight, is depicted by the hachured portion within the curve representing surfactant concentration verses HLB value in the sole FIGURE in U.S. Pat. No. 4,681,912, see the FIGURE and column 3 lines 22-37 therein.

The selection of the organic phase has a substantial effect on the minimum surfactant concentration necessary to obtain the inverse microemulsion and typically contains an oil such as hydrocarbons or hydrocarbon mixtures. Isoparafinic or linear hydrocarbons or mixtures thereof are most desirable in order to obtain inexpensive formulations.

Polymerization of the microemulsion may be carried out in any manner known to those skilled in the art. Initiation may be effected with a variety of thermal and redox free radical initiators, including peroxides, e.g. t-butyl hydroperoxide; azo compounds, e.g. azobisisobutyronitrile; inorganic compounds, such as potassium persulfate and redox couples, such as ferrous ammonium sulfate/ammonium persulfate. Initiator addition may be effected any time prior to the actual polymerization per se. Polymerization may also be effected by photochemical irradiation processes, such as ultraviolet irradiation or by ionizing irradiation from a cobalt 60 source.

Typically the aqueous solution which contains the monomers and optional comonomers as defined above and any conventional additive such as, but not limited to, chelating agents such as ethylenediaminetetraacetic acid, difunctional monomers such as methylene bis(acrylamide), pH adjusters, initiators and the like are added to a pre-mixed solution of the oil and surfactant. Once the aqueous and oil solutions are combined, an inverse microemulsion forms, typically without the need for shearing Anionic polymers may be formed by emulsion polymerization of anionic monomers such as those listed above. Another method to form an anionic polymer is by at least partially hydrolyzing a non-ionic acrylamide polymer by the addition of a caustic hydrolysis agents (i.e., so as to convert at least a portion of the amide groups on the polymer to carboxylate groups), which results in the formation of a partially hydrolyzed anionic acrylamide polymer. Hydrolysis agents useful in the present invention include, but are not limited to, alkali metal hydroxides and quaternary ammonium hydroxides. The preferred hydrolysis agents, however, are the alkali metal hydroxides and, more particularly, sodium, potassium, and lithium hydroxides. In fact, however, any material which will provide an alkali solution may be used as a hydrolysis agent.

The hydrolysis agent should be added to the polymeric emulsion as an aqueous solution slowly and with mixing. The most preferred hydrolysis agent is a 10 to 50% aqueous solution of alkali metal hydroxide, with a 20 to 40% solution being more preferred and a solution of about 30% being most preferred. The concentration of the solution of the alkali metal hydroxide is within the range of 0.2 to 30%, preferably 4 to 12%, by weight based on the polymeric emulsion. The percentage of hydrolysis agent used will vary however, according to the degree of hydrolysis desired.

While solutions with the above concentrations of the alkali metal hydroxides are, as noted above particularly useful, it is important to note that higher or lower concentrations of alkali metal hydroxides in aqueous media may also be used. Conditions favoring the use of lower concentrations of the hydrolysis agent include the desire for low levels of hydrolysis and stability factors. Higher concentrations may be used when a substantial degree of hydrolysis is desired without excessive dilution. As would be understood by one skilled in the art, stability considerations also play a role in this determination.

The hydrolysis reaction may be conducted at room temperature but more favorable results are obtained at elevated temperatures. Generally the reaction may be performed within the range of from about 10° to about 70° C. The preferred temperature range for this reaction is, however, from about 35° to about 55° C. The length of time required for the hydrolysis reaction depends upon the reactants, their concentrations, the reaction conditions and the degree of hydrolysis desired.

The molecular weight of the polymer in the water-in-oil emulsion is not critical and may range from about as low as 1000 to as high as a crosslinked polymer. Preferably, the number average molecular weight of the polymer can range from as low as 1000, or about 5000 or about 10000, or about 100000, to as high as about infinite (crosslinked) or about 60 million, or about as high as 40 million for a water soluble polymer.

In one embodiment of the present invention, the water-in-oil emulsions may be pre-dispersed in oil prior to contact with the OBM. If the emulsions are pre-dispersed with oil, the concentration of the polymer in the predisposed water-in-oil emulsion is about 0.01% to about 20%, or about 0.1% to about 10% by weight based on the total weight of the emulsion. Any type of oil may be suitable for the pre-dispersion. Preferred types of oil for pre-dispersion include kerosene, diesel, paraffin blends, internal olefins or $C_{16}$-$C_{18}$ alkene blends. A more preferred oil is whatever oil is used in the OBM.

As mentioned previously, the water-in-oil emulsion containing the above-mentioned polymers is contacted with the OBM in order to separate the solids from the liquids in the OBM. The inventors have surprisingly discovered that degree of separation of solids from the liquids in the OBM is greatly improved if the polymer in the water-in-oil emulsion is not substantially solubilized or dissolved (e.g., contacted or dissolved in excess water) prior to contact with the OBM (e.g., see Examples 7 to 9 below).

The method of the present invention may further comprise the addition of a surfactant and/or water. The surfactant may be added to the OBM before, during or after the addition of the water-in-oil emulsion. Preferably, the surfactant is added to the OBM subsequent to the addition of the water-in-oil emulsion. The surfactant may be any surface active agent that changes the interfacial tension between the oil phase and the aqueous phase in the OBM. Preferred surfactants are high HLB surfactants with an HLB value greater than about 10 or a value of about 10 to about 40 or about 10 to about 30 or about 10 to about 20. Also preferred are anionic surfactants or high HLB anionic surfactants with an HLB greater than about 10 or about 10 to about 40 or about 10 to about 30 or about 10 to about 20.

Examples of classes of such surfactants that may be used are sulfosuccinates, sulfosuccinamates, alkylaryl sulfonates, diphenylsulfonates, benzene sulfonic acids, (alkyl)naphthalene sulfonic acids, sulfates and sulfonates of oils and fatty acids, sulfates of ethoxylated alkyl phenols, sulfates of alcohols, sulfates of ethoxylated alcohols, petroleum sulfonates, sulfates of fatty esters, sulfonates of condensed naphthalenes, aliphatic or aromatic phosphate esters, alkoxylated alcohols, sodium paraffin sulfonates and mixtures thereof.

Examples of such surfactants that may be used are sodium diisobutylsulfosuccinate, sodium diamylsulfosuccinate, sodium dicyclohexylsulfosuccinate, sodium dioctylsulfosuccinate, sodium bis(2-ethylhexyl)sulfosuccinate, tetrasodium N-(1,2-dicarboxy-ethyl)-N-octadecylsulfosuccinamate, disodium ethoxylated alcohol half-ester sulfoscuccinate, sodium di(1,3-dimethylbutyl)sulfosuccinate, sodium bistridecylsulfosuccinate and mixtures thereof.

The amount of water-in oil emulsion to be contacted with the OBM should be about 0.1%, or about 0.5% by weight on the lower range to about 20%, or about 10%, or about 5%, or about 2% by weight on the upper range, based on the total weight of the ODMB. The preferred range of the amount of water-in oil emulsion to be contacted with the OBM is 0.5% to 5% by weight.

The OBM and water-in-oil emulsion is preferably mixed. Any suitable method may be used to mix the components. Non-limiting examples of methods or apparatus that may be used to mix the components are flow mixers, in-line mixers, gas agitation or mechanical mixers. More detailed information on these mixing techniques or apparatus may be found, for example, in Chemical Engineer's Handbook, Fifth Edition, McGraw-Hill Book Company, 1973, pp 19-3 to 19-14 and 21-3 to 21-10. Preferably the OBM and the water-in-oil emulsion composition are mixed such that it is well-dispersed.

The oil may be separated from the OBM by mechanical or gravitational separation. Non-limiting examples of mechanical separation is the use of a centrifuge, cyclone, pressure filtration or vacuum assisted filtration. Example of gravitational separation is the use of a clarifier, thickener or continuous countercurrent decantation. More detailed information on such means may be found, for example, in Chemical Engineer's Handbook, Fifth Edition, McGraw-Hill Book Company, 1973, pp 19-44 to 19-104 and 21-11 to 21-14.

Another embodiment of this invention is a composition comprising an oil-based mud with a water-in-oil emulsion comprising a polymer derived from at least one water-soluble monomer, wherein the polymer is not dissolved prior to contact with the oil-based mud. The same polymers as mentioned above may be used in the composition. The composition may further comprise a surfactant. The same surfactants listed above may be used in the composition. Preferably, the water-in-oil emulsion is first added to the OBM prior to the addition of the surfactant.

The present invention will now be illustrated by the following examples. The examples are not intended to limit the scope of the present invention. In conjunction with the general and detailed descriptions above, the examples provide further understanding of the present invention.

EXAMPLES

Example 1 to 6

Oil Separation of OBDM's using a Water-in-oil Emulsion

Three different waste OBDMs were obtained from a waste drilling mud treatment facility in Colombia. The oil in these muds was a diesel-type oil. The mud properties are tabulated below.

TABLE 1

Waste Oil-Based Drilling Muds from Colombia.

| OBDM name | Description | Mud weight (ppb) | BSW (%) | Retort analysis (water/solids/oil) (%) | Electrical stability (V) |
|---|---|---|---|---|---|
| OBDM A | Blend of aged OBDMs from 2nd and 3rd perforation stages. | 9.75 | 44 | 32/12/56 | 157 |
| OBDM B | Blend of aged OBDMs from 2nd and 3rd | 9.80 | 44 | 28/16/56 | 160 |

TABLE 1-continued

Waste Oil-Based Drilling Muds from Colombia.

| OBDM name | Description | Mud weight (ppb) | BSW (%) | Retort analysis (water/ solids/oil) (%) | Electrical stability (V) |
|---|---|---|---|---|---|
| | perforation stages. | | | | |
| OBDM C | Fresh, high solids OBDM with coarse solids removed by centrifugation. | 8.70 | 48 | 40/8/52 | 240 |

The compositions of the OBDMs were determined using two methods. A retort analysis resulted in a determination of the individual amounts of water, solids and oil. The combined (water+solids) contents of the OBDMs both before and after treatment were also determined using a solvent extraction method, designated as the BSW (base solids and water ratio) method, and described below.

A 40 ml sample of the OBDMD oil phase is sampled after gravity settling. Approximately 40 ml of Varsol® (aliphatic hydrocarbon fluid from ExxonMobil) and 3 drops of demulsifier surfactant was added to the OBDM and mixed. The resulting composition mixture was centrifuged for 2 minutes at 2000 rpm. The volume % of solids separated after centrifugation was determined and multiplied by 2 to obtain the BSW value.

The BSW value is the volume percentage of solids and water that centrifuges out from a sample after it has been diluted 1:1 with an aliphatic hydrocarbon oil (e.g. Varsol). Treatments resulting in separated oil phases that yield BSW values less than or equal to about 2% are considered to have been successful treatments.

Experimental Protocol

The experimental protocol that was used to assess the efficacy of a solid-liquid separation treatment of an OBDM is as follows. The waste oil-based drilling mud sample is mixed using an overhead stirrer in order to provide a well dispersed homogeneous composition. A sample of the mud is weighed into a 600-ml glass beaker. The water-in-oil emulsion (Polymer Emulsion I described below) is dispersed into diesel oil in a separate beaker using a spatula until the composition is homogeneous. The water-in-oil is then added to the mud and mixed for 3 minutes using an overhead stirrer until the composition is homogeneous. The treated mud is allowed to settle for 1 hour and observations are then made on the physical state of the treated mud. The gravity-separated liquid phase is decanted and analyzed using the BSW method.

Polymeric Emulsion I is an inverse water-in-oil emulsion in which the discrete aqueous phase contains a copolymer of acrylamide (45 mol %) and 2-acryloyloxyethyltrimethylammonium chloride (55 mol %), with 10 ppm of N,N'-methylenebisacrylamide as branching agent, prepared in a manner similar to U.S. Pat. No. 5,945,494 (example 3B), incorporated herein by reference. When this polymeric emulsion is pre-dispersed into diesel oil, it disperses well and forms a homogeneous composition.

The results of various mud treatments using Polymeric Emulsion I are described in Table 2.

TABLE 2

Treatment of OBDMs A, B, and C with Polymeric Emulsion I.

| Ex. | OBDM | OBDM (g) | Poly. Emul. | Poly. Emul. (ml) | Disp. oil | Disp. oil (ml) | BSW (%) | Observations |
|---|---|---|---|---|---|---|---|---|
| 1 | A | 150 | None | 0 | None | 0 | 44 | Control |
| 2 | B | 150 | None | 0 | None | 0 | 44 | Control |
| 3 | C | 150 | None | 0 | None | 0 | 48 | Control |
| 4 | A | 150 | I | 1.5 | Diesel | 150 | 1.8 | Large flocs visible, good oil separation |
| 5 | B | 150 | I | 1.5 | Diesel | 150 | 1.25 | Large flocs visible, good oil separation |
| 6 | C | 150 | I | 1.5 | Diesel | 150 | 2.0 | Medium flocs, good oil separation |

The results of various mud treatments using Polymeric resulted in the formation of large aggregates that separated readily under the action of gravity, leaving an easily recoverable, clean oil phase.

Examples 7 to 9

Pre-dissolving the Water-in-oil Emulsion in Water before Contacting with the OBDM These examples illustrate that if the polymeric emulsion is pre-dissolved in water, so as to form an aqueous polymer solution, then the solid-liquid separation of the treated OBDM is poor.

Polymeric Emulsion II is an inverse polymeric emulsion in which the discrete aqueous phase contains a copolymer of acrylamide (45 mol %) and 2-acryloyloxyethyltrimethylammonium chloride (55 mol %) prepared in a manner similar to U.S. Pat. No. 5,763,523 (example 19), incorporated herein by reference.

Polymeric Emulsions I and II were separately dissolved in water by mixing 1 ml of the polymeric emulsion into 100 ml of tap water using a Braun mixer for 15 seconds, followed by quiescent aging for 1 hour. This resulted in a homogenous aqueous polymer solution.

The OBDM used in these tests was OBDM B used in Examples 2 and 5 above.

Experimental Protocol

The experimental protocol used to assess the efficacy of a solid-liquid separation treatment is as follows. The waste oil-based drilling mud sample is mixed using an overhead stirrer in order to provide a homogeneous composition. A sample of the mud is weighed into a 250-ml glass beaker. Either the polymer emulsion is dispersed into diesel oil in a separate beaker using a spatula until the composition is homogeneous, or the polymeric emulsion is dissolved in water as described above. The dispersed polymeric emulsion or dissolved polymer solution is then added to the mud and mixed in for 30 seconds using an overhead stirrer at 200 rpm. Observations are then made on the physical state of the treated mud. About 100 ml of the treated mud is loaded into a glass centrifuge tube and centrifuged for 10 minutes at 2000 rpm. Observations are made on the physical state of the centrifuged mud. Note is taken of the volume of each layer, and its general physical character (e.g. compacted solids, slurry, water, emulsion, oil).

The results of various mud treatments using Polymeric Emulsions I and II are described in Table 3 below.

TABLE 3

Treatment of OBDM B with Polymeric Emulsions I and II.

| Ex. | OBDM B (g) | Poly. Emul. | Poly. Emul. (ml) | Disp. Liquid* | Disp. liquid (ml) | Sep. phase | Sep. phase (vol %) | Sep. phase quality | Observations |
|---|---|---|---|---|---|---|---|---|---|
| 7 | 60 | I | 0.6 | Diesel | 50 | Oil<br>Solids | 73<br>27 | Clean oil | Clear cut separation of phases. |
| 8 | 100 | I | 1.0 | Water | 100 | Slurry#<br>Solids | 80<br>20 | Poor | Polymer solution did not mix well with OBDM. |
| 9 | 100 | II | 1.0 | Water | 100 | Slurry#<br>Solids | 98<br>2 | Poor | Polymer solution did not mix well with OBDM. |

*Dispersing liquid or solvent

Unseparated oil-based mud with high solids content

The results demonstrate a clean separation of aggregated solids and a clean oil phase occurred when OBDM B was treated with Polymeric Emulsion I dispersed in diesel oil (Example 7). However, when Polymeric Emulsions I or II were pre-dissolved in water, the resulting aqueous polymer solutions did not mix well with the OBDM B, and the separation of the oil from the solids phase was very poor or non-existent (Examples 8 and 9).

Examples 10 to 15

Oil Separation Using Combination of Water-in-oil Emulsions, Surfactant and Water in the OBDM This set of examples demonstrates the utility of treatments for the separation of oil from OBDMs based on combinations of polymeric inverse emulsions, surfactants and water.

The OBDM was obtained from a waste drilling mud treatment facility in Mexico and is designated OBDM D. The oil in this mud a diesel-type oil. The mud properties are tabulated below (Table 4). The solids fall into two categories: high gravity solids (HGS) and low gravity solids (LGS).

TABLE 4

Waste Oil-Based Drilling Mud from Mexico.

| OBDM name | Description | Mud weight (ppb) | Oil (wt %) | Water (wt %) | solids (vol %) | HGS (wt %) | LGS (wt %) |
|---|---|---|---|---|---|---|---|
| OBDM D | Waste diesel-based drilling mud. | 12.79 | 40 | 36.0 | 24.0 | 12.58 | 10.73 |

Experimental Protocol

The experimental protocol used to assess the efficacy of a solid-liquid separation treatment is as follows. The oil-based drilling mud sample is mixed in order to provide a homogeneous composition. A 60-gram sample of the mud is weighed into a 250-ml plastic beaker. Water is added, if appropriate, and mixed in by hand using a spatula until the composition is homogeneous. Surfactant is added, if appropriate, and mixed in by hand using a spatula until the composition is homogeneous. The polymer emulsion is dispersed into an oil compatible with the OBDM in a separate plastic beaker, and mixed in by hand using a spatula until the composition is homogeneous. Polymeric Emulsion I, described above, is then added to the partially treated mud, if appropriate, and mixed in by hand using a spatula until the composition is homogeneous. In some cases the undispersed polymeric emulsion is added directly to the mud, and then mixed in by hand using a spatula until the composition is homogeneous. Observations are then made on the physical state of the treated mud. About 50 ml of the treated mud is loaded into a plastic centrifuge tube and centrifuged for 10 minutes at 2000 rpm (e.g. in an IEC Centra GP-8 swinging basket centrifuge). Observations are made on the physical state of the centrifuged mud. Note is taken of the volume of each layer, and its general physical character (e.g. compacted solids, slurry, water, emulsion, oil).

The general appearances of the separated phases and the results of various mud treatments using Polymeric Emulsion I are described in Table 5.

*Key to Appearance of Separated Phase

Oil=reasonably clean oil layer

Water=a reasonably clean water layer.

Emulsion=a poorly clarified water layer or 'rag' layer

Slurry=a mud phase with lower solids than the original, but not completely separated Solids=a well separated layer of solids, possibly containing imbibed water Examples 10 to 15 show that, for the specific OBDM D, using all three components (polymer emulsion, surfactant and water) in the treatment program resulted in the best separation of oil phase from the solids. In some cases not only were solids separated from the liquid phase, but the liquid phase was additionally separated into oil and aqueous phases. It was also clear, from this group of examples, that the water-in-oil emulsion was a necessary component in any efficacious treatment.

Examples 16 to 20

Treatment of OBDM Using Various Water-in-oil Emulsions

This set of examples demonstrates the range of polymeric emulsion types that may be used in successfully treating OBDMs to produce a solid-liquid separation.

TABLE 5

Treatment of OBDM D with Polymeric Emulsion I

| Ex. | OBDM (g) | Poly. Emul. | Poly. Emul. (ml) | Disp. oil | Disp. oil (ml) | Water (ml) | Surf.± (ml) | Sep.* phase | Sep. phase (vol %) | Observations |
|---|---|---|---|---|---|---|---|---|---|---|
| 10 | 60 | I | 1.5 | Diesel | 5 | 15 | 3 | Oil | 19 | Clear cut separation of phases, clean oil. |
| | | | | | | | | Water | 24 | Transparent water layer. |
| | | | | | | | | Solids | 57 | Compacted solids layer |
| 11 | 60 | I | 1.5 | Diesel | 5 | 0 | 3 | Slurry | 100 | No separation. |
| | | | | | | | | Water | 0 | |
| | | | | | | | | Solids | 0 | |
| 12 | 60 | I | 1.5 | Diesel | 5 | 15 | 0 | Oil | 10 | Dirty oil layer. |
| | | | | | | | | Slurry | 90 | Unseparated mud |
| | | | | | | | | Solids | 0 | |
| 13 | 60 | I | 1.5 | None | 0 | 15 | 3 | Oil | 14 | Clear cut separation of phases, clean oil. |
| | | | | | | | | Water | 19 | Transparent water layer |
| | | | | | | | | Solids | 67 | Compacted solids layer |
| 14 | 60 | None | 0 | Diesel | 5 | 15 | 3 | Slurry | 100 | No separation. |
| | | | | | | | | Water | 0 | |
| | | | | | | | | Solids | 0 | |
| 15 | 60 | I | 1.5 | Diesel | 5 | 15 | 3 | Oil | 21 | Clear cut separation of phases, clean oil. |
| | | | | | | | | Water | 21 | Transparent water layer |
| | | | | | | | | Solids | 58 | Compacted solids layer |

±Surfactant was a mixture of a dioctylsulfosuccinate (27 wt %) and a dicarboxyethyl octadecylsulfosuccinamate (57 wt %) in 2-propanol (16 wt %).

Polymeric Emulsion III is an inverse polymeric emulsion in which the discrete aqueous phase contains a copolymer of acrylamide (45 mol %) and dimethylaminoethylmethacrylate (55 mol %) prepared as follows. The oil phase and aqueous phase described below are first prepared separately.

Oil Phase Preparation: In a 1000 mL resin flask is place 8.64 g sorbitan monooleate, 12.15 g ethoxylated alcohol (60% EO) and 167.71 g low odor paraffin oil. The mixture is stirred with a magnetic stirrer until it was homogeneous.

Aqueous Phase Preparation: To a 1000 mL beaker is added 145.29 g aqueous acrylamide (52% solution), 160.50 g deionized water, 204.45 g dimethylaminoethyl methacrylate, and 1.40 g Versenex® 80 (a product of Dow Chemical Company). Cooling is provided to maintain the temperature below 100° F. Approximately 70 g of concentrated $H_2SO_4$ is slowly added to adjust the pH to 3.5. To the mixture are added 0.028 g hypophosphite, and enough deionized water to bring the total aqueous phase to 594 g. The mixture is stirred with a magnetic stirrer until it was homogeneous.

Thereafter the oil and aqueous phases are combined and homogenized to yield a monomer emulsion. The polymerization initiator, 0.14 g Vazo® 64 (a product of DuPont Chemical Company), was then added to the monomer emulsion. The monomer emulsion is purged with nitrogen and heated to 125 to 130° F. to start the polymerization. The emulsion temperature is maintained at 125 to 130° F. until the polymerization is complete. The emulsion is cooled to room temperature and 8.0 g ethoxylated alcohol (60% EO) is added with stirring.

Polymeric Emulsion IV is an inverse polymeric emulsion in which the discrete aqueous phase contains a copolymer of acrylamide (90 mol %) and methacrylamidopropyltrimethyl-ammonium chloride (10 mol %) is prepared in a manner similar to European patent application EP 0 374 457 A2 (example 16), incorporated herein by reference.

Polymeric Emulsion V is an inverse polymeric emulsion in which the discrete aqueous phase contains a copolymer of acrylamide (70 mol %) and ammonium acrylate (30 mol %) prepared in a manner similar to U.S. Pat. No. 5,763,523 (example 23), incorporated herein by reference Polymeric Emulsion VI is an inverse polymeric emulsion in which the discrete aqueous phase contains a copolymer of acrylamide (90 mol %) and sodium acrylate (10 mol %) made from the alkaline hydrolysis of an inverse polymeric emulsion in which the discrete aqueous phase contains poly(acrylamide). This is prepared in a manner similar to U.S. Pat. No. 5,548,020 (example 5), incorporated herein by reference.

The OBDM was obtained from a waste drilling mud treatment facility in Mexico, and is designated OBDM E. The oil in this mud was a diesel-type oil. The mud properties are shown in Table 6 below. The solids fall into two categories: high gravity solids (HGS) and low gravity solids (LGS).

TABLE 6

Waste Oil-Based Drilling Mud from Mexico.

| OBDM name | Description | Mud weight (ppb) | Oil (wt %) | Water (wt %) | solids (vol %) | HGS (wt %) | LGS (wt %) |
|---|---|---|---|---|---|---|---|
| OBDM E | Waste diesel-based drilling mud. | 14.61 | 40 | 26.5 | 33.5 | 16.71 | 16.11 |

The results of the various treatments of the polymeric emulsion with OBDM E are shown in Table 7.

TABLE 7

Treatment of OBDM D with Polymeric Emulsions III-VI

| Exp. | OBDM E (g) | Poly. Emul | Poly. Emul (ml) | Disp. oil | Disp oil (ml) | Water* (ml) | Surf.± (ml) | Sep. phase | Sep. phase (vol %) | Observations |
|---|---|---|---|---|---|---|---|---|---|---|
| 16 | 60 | III | 1.5 | Diesel | 5 | 0 | 0 | Oil | 12 | Clear cut separation of phases, clean oil. |
| | | | | | | | | Water | 28 | Transparent water layer. |
| | | | | | | | | Solids | 60 | Compacted solids layer. |
| 17 | 60 | IV | 1.5 | Diesel | 5 | 15 | 3 | Oil | 22 | Clear cut separation of phases, clean oil. |
| | | | | | | | | Water | 27 | Turbid, white water layer. |
| | | | | | | | | Solids | 51 | Compacted solids layer |

TABLE 7-continued

| Treatment of OBDM D with Polymeric Emulsions III-VI | | | | | | | | | | |
|---|---|---|---|---|---|---|---|---|---|---|
| Exp. | OBDM E (g) | Poly. Emul | Poly. Emul (ml) | Disp. oil | Disp oil (ml) | Water* (ml) | Surf.± (ml) | Sep. phase | Sep. phase (vol %) | Observations |
| 18 | 60 | V | 1.5 | Diesel | 5 | 15 | 3 | Oil | 17 | Clear cut separation of phases, clean oil. |
| | | | | | | | | Water | 21 | Turbid water layer. |
| | | | | | | | | Solids | 62 | Moderately compacted solids layer. |
| 19 | 60 | VI | 1.5 | Diesel | 5 | 15 | 3 | Oil | 12 | Clear cut separation of phases, clean oil. |
| | | | | | | | | Water | 33 | Transparent water layer |
| | | | | | | | | Solids | 55 | Moderately compacted solids layer. |
| 20 | 60 | II | 1.5 | Diesel | 5 | 15 | 3 | Oil | 17 | Clear cut separation of phases, clean oil. |
| | | | | | | | | Water | 31 | Transparent water layer |
| | | | | | | | | Solids | 52 | Compacted solids layer. |

±Surfactant was a mixture of a dioctylsulfosuccinate (27 wt %) and a dicarboxyethyl octadecylsulfosuccinamate (57 wt %) in 2-propanol (16 wt %).
*Water and surfactant were pre-mixed before adding to the OBDM.

These examples show that either cationic or anionic polymeric emulsions may be successfully used to separate the different phases in OBDMs. Example 16 also shows that separation of the oil and aqueous phases can result from using only the polymeric emulsion in the treatment, without the addition of a surfactant.

Examples 21 to 23

Treatment of Various Oil Type OBDMs

This set of examples demonstrates that the invention may be used to produce a solid-liquid separation in OBDMs consisting of different oil types. Previous Examples 1-20 were based on diesel-type oil OBDMs. The other major class of oils used to produce OBDMs is synthetic oils, which includes paraffins and olefins. A waste synthetic OBDM was prepared by adding low gravity solids to a typical synthetic OBDM based on an olefin oil. The original synthetic oil-based mud is designated OBDM F, and the waste synthetic oil-based mud is designated OBDM G. The mud properties are shown in Table 8 below.

TABLE 8

| Waste Synthetic Oil-Based Drilling Mud. | | | | | | | |
|---|---|---|---|---|---|---|---|
| OBDM name | Description | Mud weight (ppb) | Oil (wt %) | Water (wt %) | solids (vol %) | HGS (wt %) | LGS (wt %) |
| OBDM F | Synthetic oil-based drilling mud. | 13.16 | 54.0 | 21.5 | 24.5 | 18.14 | 5.45 |
| OBDM G | Synthetic oil-based drilling mud with added LGS. | | | | | | 15.0 |

Polymeric Emulsion VII is an inverse polymeric emulsion in which the discrete aqueous phase contains a copolymer of acrylamide (45 mol %) and 2-acryloyloxyethyltrimethylammonium chloride (55 mol %), with 17 ppm of N,N'-methylenebisacrylamide as branching agent, prepared in a manner similar to U.S. Pat. No. 5,945,494 (example 3B). When this polymeric emulsion is mixed into diesel oil, it disperses well and forms a homogeneous composition.

The results of various treatments are shown in Table 9.

TABLE 9

Treatment of OBDM G with Polymeric Emulsions III and VII

| Ex. | OBDM G | Poly. Emul | Poly. Emul (ml) | Disp. oil | Disp. oil (ml) | Water (ml) | Surf. (ml) | Sep. phase | Sep. phase (vol %) | Observations |
|---|---|---|---|---|---|---|---|---|---|---|
| 21 | 60 | VII | 1.5 | Diesel | 5 | 15 | 3 | Oil | 16 | Clear cut separation of phases, brown oil. |
| | | | | | | | | Water | 16 | Transparent water layer. |
| | | | | | | | | Solids | 68 | Compacted solids layer. |
| 22 | 60 | III | 1.5 | Diesel | 5 | 15 | 3 | Oil | 18 | Clear cut separation of phases, brown oil. |
| | | | | | | | | Solids | 82 | Moderately compacted solids layer. |
| 23 | 60 | III | 1.5 | None | 0 | 15 | 3 | Oil | 17 | Clear cut separation of phases, brown oil. |
| | | | | | | | | Solids | 62 | Moderately compacted solids layer. |

Good separation of the solid and liquid phases was achieved using two different polymeric emulsions (Examples 21 and 22). Example 23 shows that in some cases the polymeric emulsion does not need to be pre-dispersed into oil, and may be used neat.

Examples 24 to 29

Treatment OBDMs Using Polymeric Emulsions and Various Surfactants

This set of examples illustrates that combinations of polymeric emulsion and surfactant can be chosen to selectively create either an oil-solids separation, or an oil-water-solids separation in an OBDM.

The OBDM was obtained from a drilling mud treatment facility in the United States, and is designated OBDM H. The oil in this mud was a synthetic-type oil. The mud properties are shown in Table 10 below. The solids fall into two categories: high gravity solids (HGS) and low gravity solids (LGS).

TABLE 10

Waste Oil-Based Drilling Mud from the United States.

| OBDM name | Description | Mud weight (ppb) | Oil (wt %) | Water (wt %) | solids (vol %) | HGS (wt %) | LGS (wt %) |
|---|---|---|---|---|---|---|---|
| OBDM H | Synthetic-oil based drilling mud. | 13.43 | 58 | 17.5 | 24.5 | 20.8 | 2.7 |

The results of the various treatments of OBDM H with polymeric emulsion III and surfactants are shown in Table 11. Only the surface active agent in the surfactant composition is indicated.

TABLE 11

Treatment of OBDM H with Polymeric Emulsion III and Various Surfactants

| Exp. | OBDM H (g) | Poly. Emul | Poly. Emul (ml) | Disp. oil | Disp oil (ml) | Surface Active agent | Surf. (ml) | Sep. phase | Sep. phase (vol %) | Observations |
|---|---|---|---|---|---|---|---|---|---|---|
| 24 | 81 | III | 3 | olefin | 3 | none | 0 | Oil-solids slurry | 60 | Very dirty slurry of solids in oil. |
| | | | | | | | | Solids | 40 | Compacted solids layer. |
| 25 | 81 | III | 3 | olefin | 3 | Na dicarboxyethyl octadecylsulfo succinamate | 2 | Oil-solids slurry | 70 | Very dirty slurry of solids in oil. |
| | | | | | | | | Solids | 30 | Compacted solids layer. |
| 26 | 81 | III | 3 | olefin | 3 | Na dicyclohexyl sulfosuccinate | 2 | Oil | 40 | Clear cut separation of phases, slightly dirty oil. |
| | | | | | | | | Solids | 60 | Compacted solids layer. |
| 27 | 81 | III | 2 | olefin | 2 | Na diamyl sulfosuccinate | 3 | Oil | 35 | Clear cut separation of phases, slightly dirty oil. |
| | | | | | | | | Water | 18 | Clear water layer. |
| | | | | | | | | Solids | 47 | Compacted solids layer. |
| 28 | 80 | None | 0 | None | 0 | Na dicarboxyethyl octadecylsulfo succinamate | 2 | Oil | 62 | Dirty oil. |
| | | | | | | | | Solids | 38 | Compacted solids layer. |
| 29 | 80 | none | 0 | none | 0 | Na dicyclohexyl sulfosuccinate | 2 | Oil | 51 | Dirty oil. |
| | | | | | | | | Water | 6 | Slightly dirty water |
| | | | | | | | | Solids | 43 | Compacted solids layer. |
| 30 | 80 | none | 0 | none | 0 | Na diamyl sulfosuccinate | 2 | Oil | 46 | Dirty oil. |
| | | | | | | | | Water | 15 | Slightly dirty water |
| | | | | | | | | Solids | 39 | Compacted solids layer. |

The above examples show that only particular combinations of polymeric emulsion and surfactant resulted in useful solid-liquid separations, and that the OBM can be selectively separated into either oil-and-solids, or oil-water-solids phases, depending on the particular combination of polymeric emulsion and surfactant. The use of surfactant alone, while it did allow some improvement in the separation, always resulted in a dirty oil phase (solids contamination). The use of polymeric emulsion in combination with certain surfactants allowed for both the improved separation and a cleaner recovered oil phase. Our experience shows that different combinations of polymeric emulsion and surfactant may be required to effectively treat (i.e. cause a useful solid-liquid separation) different OBMs, depending on the mud compositions.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method of separating a solid phase and a liquid phase in an oil-based mud comprising the steps of:

(i) contacting said oil-based mud with a water-in-oil emulsion comprising a polymer derived from at least one water-soluble monomer, wherein said polymer is not dissolved prior to contact with said oil-based mud, wherein the polymer is prepared by water-in-oil emulsion polymerization, and wherein the emulsion comprises polymer particles of average discrete phase particle size of less than about 10 microns;

(ii) mixing said water-in-oil emulsion and said oil-based mud;

(iii) separating the solid phase and the liquid phase;

wherein said at least one water-soluble monomer is selected from (alkyl)acrylamide, (allyl)acrylic acid, N-vinylpyrrolidone, N-vinylacetamide, N-vinylformamide, acrylonitrile, fumaric acid, crotonic acid, maleic acid, hydroxyalkyl methacrylates, 2-acrylamido-2-alkylsulfonic acids wherein the alkyl group contains 1 to 6 carbon atoms, styrene sulfonic acids; and salts of any of the foregoing thereof; or monomers having the structure of formulas I, II or III

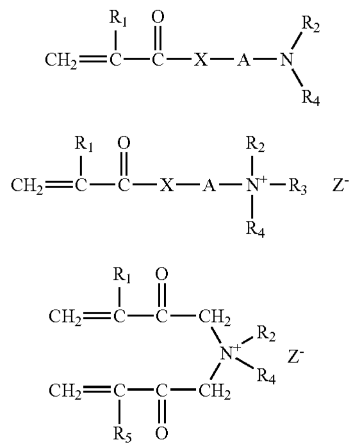

wherein $R_1$, $R_2$, and $R_5$ are each independently hydrogen or a $C_1$ to $C_6$ alkyl; $R_3$ and $R_4$ are each independently hydrogen, a $C_1$ to $C_{12}$ alkyl, aryl, arylalkyl or hydroxyethyl; and $R_2$ and $R_4$ or $R_2$ and $R_3$ can combine to form a cyclic ring containing one or more hetero atoms; Z is the conjugated base of an acid, X is oxygen or —$NR_6$ wherein $R_6$ is hydrogen or a $C_1$ to $C_6$ alkyl; and A is a $C_1$ to $C_{12}$ alkylene; and further comprising adding a surfactant.

2. The method of claim 1, wherein said polymer is a homopolymer or copolymer of monomers selected from (meth)acrylamide, monomers of Formula I and II and combinations thereof, wherein $R_1$ is hydrogen or methyl, $R_2$ to $R_4$ are methyl or ethyl and A is $C_1$ to $C_4$ alkylene.

3. The method of claim 1, wherein said polymer is a copolymer of an (alkyl)acrylamide monomer and at least one second monomer selected from N-vinylpyrrolidone, N-vinylacetamide, N-vinylformamide, acrylonitrile, acrylic acid, methacrylic acid, ethylacrylic acid, fumaric acid, crotonic acid, maleic acid, hydroxyalkyl methacrylates, 2-acrylamido-2-alkylsulfonic acids wherein the alkyl group contains 1 to 6 carbon atoms, styrene sulfonic acids, vinyl sulfonic acid; and salts of any of the foregoing thereof; or monomers of Formulas I, II or III.

4. The method of claim 1, wherein said polymer is a copolymer of (meth)acrylamide and at least one second monomer selected from the group consisting of N,N-dimethylaminoethyl(meth)acrylate or its salts, quaternary N,N-dimethylaminoethyl(meth)acrylates, tertiary or quaternary N,N-dimethylaminopropyl acrylamides, tertiary or quaternary N,N-dimethylaminomethyl acrylamides and dialkyl dimethyl ammonium halides.

5. The method of claim 1, wherein said polymer is anionic and is derived by copolymerization of (meth)acrylamide and (meth)acrylic acid.

6. The method of claim 1, wherein said polymer is anionic and is derived by hydrolysis.

7. The method of claim 1, wherein said polymer is branched or crosslinked.

8. The method of claim 1, wherein the concentration of said polymer in said water-in-oil emulsion is about 10% to about 70% by weight based on the total weight of the emulsion.

9. The method of claim 1, wherein said water-in-oil emulsion is pre-dispersed with oil before contacting with the oil-based mud.

10. The method of claim 9, wherein the concentration of said polymer in said water-in-oil emulsion is about 0.1% to about 10% by weight based on the total weight of the emulsion.

11. The method of claim 9, wherein said pre-dispersed oil is kerosene, diesel, paraffin blends, internal olefins or $C_{16}$-$C_{18}$ alkene blends.

12. The method of claim 1, wherein said the oil-based mud is contacted with the water-in-oil emulsion prior to contact with the surfactant.

13. The method of claim 1, wherein said surfactant has an HLB value greater than about 10.

14. The method of claim 1, wherein said surfactant is anionic.

15. The method of claim 1, wherein said surfactant is selected from sulfosuccinates, sulfosuccinamates, alkylaryl sulfonates, diphenylsulfonates, benzene sulfonic acids, (alkyl)naphthalene sulfonic acids, sulfates and sulfonates of oils and fatty acids, sulfates of ethoxylated alkyl phenols, sulfates of alcohols, sulfates of ethoxylated alcohols, petroleum sulfonates, sulfates of fatty esters, sulfonates of condensed naphthalenes, aliphatic or aromatic phosphate esters, alkoxylated alcohols, sodium paraffin sulfonates and mixtures thereof.

16. The method of claim 1, wherein said surfactant is selected from the group consisting of: sodium diisobutylsulfosuccinate, sodium diamylsulfosuccinate, sodium dihexyllsulfosuccinate, sodium dicyclohexylsulfosuccinate, sodium dioctylsulfosuccinate, sodium bis(2-ethylhexyl)sulfosuccinate, tetrasodium N-(1,2-dicarboxy-ethyl)-N-octadecylsulfosuccinamate, disodium ethoxylated alcohol half-ester sulfosuccinate, sodium di(1,3-dimethylbutyl) sulfosuccinate, sodium bistridecylsulfosuccinate and mixtures thereof.

17. The method of any claims 1 to 10 and 12 to 11, wherein said oil-based mud is an oil-based drilling mud.

* * * * *